(12) United States Patent
Van Schaik et al.

(10) Patent No.: US 7,872,666 B2
(45) Date of Patent: Jan. 18, 2011

(54) AUTOMATIC POLARIZER FOR CCTV APPLICATIONS

(75) Inventors: Sander-Willem Van Schaik, Utrecht (NL); Jan Klijn, Breda (NL); Peter Opmeer, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 11/914,797

(22) PCT Filed: Dec. 22, 2005

(86) PCT No.: PCT/EP2005/057119

§ 371 (c)(1),
(2), (4) Date: Nov. 19, 2007

(87) PCT Pub. No.: WO2007/071290

PCT Pub. Date: Jun. 28, 2007

(65) Prior Publication Data

US 2008/0246948 A1    Oct. 9, 2008

(51) Int. Cl.
*H04N 13/04* (2006.01)
*G02B 5/30* (2006.01)
*G01J 3/447* (2006.01)

(52) U.S. Cl. .................. 348/57; 359/352; 356/327

(58) Field of Classification Search .................. None
See application file for complete search history.

(56) References Cited

U.S. PATENT DOCUMENTS

| | | | | |
|---|---|---|---|---|
| 6,028,303 | A | * | 2/2000 | Suzuki ............... 250/225 |
| 6,137,958 | A | * | 10/2000 | Toyoda ............... 396/65 |
| 7,132,654 | B2 | | 11/2006 | Moisel |
| 2002/0030755 | A1 | | 3/2002 | Uchino |
| 2002/0088927 | A1 | | 7/2002 | Simchoni |
| 2004/0195508 | A1 | * | 10/2004 | Moisel ............... 250/330 |
| 2006/0268231 | A1 | * | 11/2006 | Gil et al. ............... 351/221 |

FOREIGN PATENT DOCUMENTS

| | | |
|---|---|---|
| EP | 1 465 002 | 10/2004 |
| JP | 9-83879 | * 3/1997 |
| JP | 2000-278434 | 10/2000 |

* cited by examiner

*Primary Examiner*—Lin Ye
*Assistant Examiner*—Euel K Cowan
(74) *Attorney, Agent, or Firm*—Michael J. Striker

(57) ABSTRACT

The invention is related to a camera device (10) for CCTV applications. The camera device (10) comprises a sensor (12) comprising a lens (14) for monitoring the scene in front of the camera device (10). At least one polarizer element (16) is assigned to said sensor (12), the at least one polarizer element (16) being rotatably mounted with respect to said sensor (12), or said polarizer element (16) uses opto-electric effects.

5 Claims, 4 Drawing Sheets

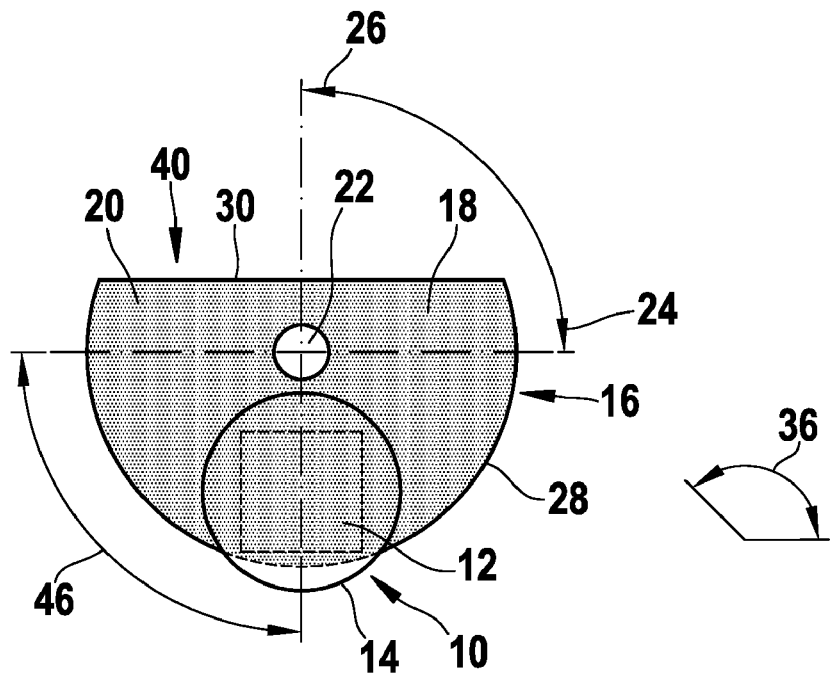
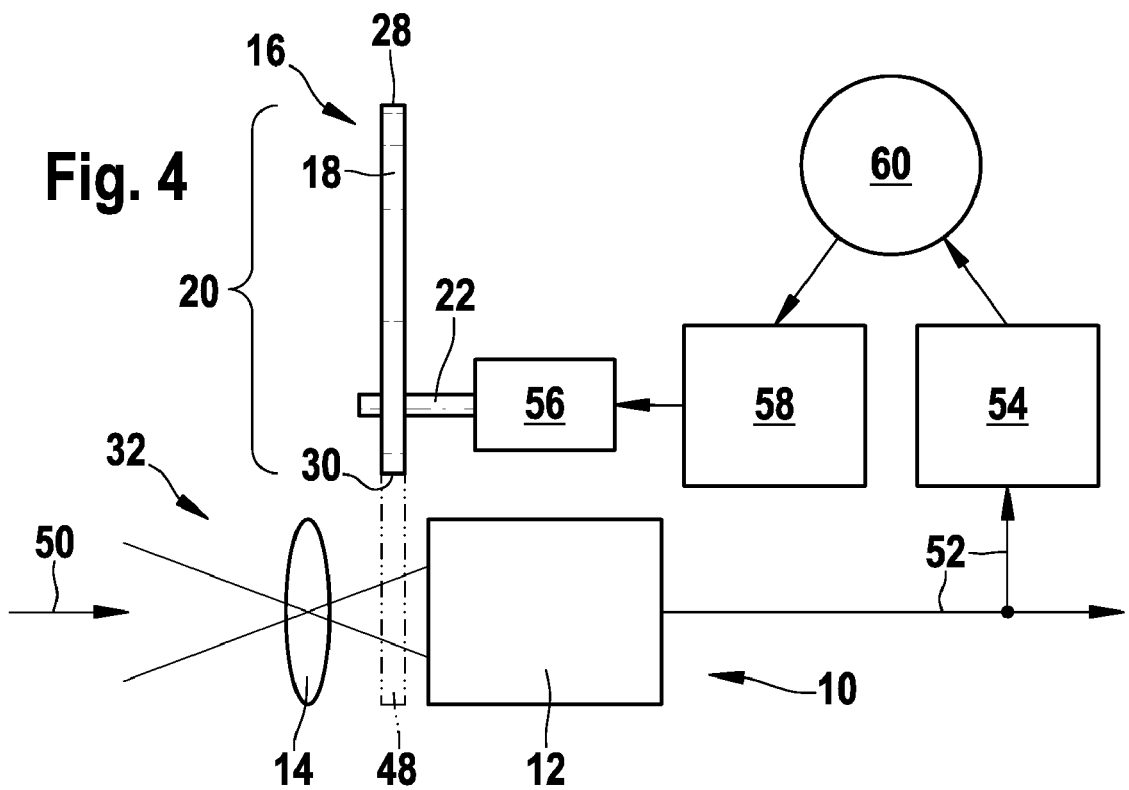

AUTOMATIC POLARIZER FOR CCTV APPLICATIONS

CROSS-REFERENCE

The invention described and claimed hereinbelow is also described in PCT/EP2005/057119, filed on Dec. 22, 2005. This Patent Application, whose subject matter is incorporated here by reference, provides the basis for a claim of priority of invention under 35 U.S.C. 119(a)-(d).

BACKGROUND OF THE INVENTION

The use of polarizer filters is known from photography applications in order to improve contrast. In photography applications, the polarizing angle needs to be adjusted in order to get a maximum suppression of the reflections, which on a photo camera is done manually. The adjustment of the polarizing angle is dependent on the position of the sun and environmental circumstances, to mention but a few such as reflections on a water, which tend to blind the observer and prevent seeing what is in the water. To improve the observation conditions in photography, the polarizers used with photographic cameras are adjusted accordingly. Since the user of the photographic camera is close to the camera, the adjustment of the polarization angle by adjusting the polarizer can be done manually and does not constitute a problem.

For video systems used as CCTV systems, there exists the problem that for video systems using a sensor (either CCD or CMOS)-camera, in the following referred to as CCTV applications, the sensor-camera is mounted in places that in general are not nearby or not easy to access. Since the user of a sensor-camera, i.e. the user of a CCTV application, is not near to the sensor-camera, the change of a polarization angle cannot be realized manually. However, the polarizing angle needs to be adjusted in order to get the maximum suppression of the reflections. In order to realize an adjustment of the polarizing angle, a motor is used. Video cameras used as CCTV-cameras in general have a video detector to establish a measure for the video level. Many forms of detectors are known, some just averaging the video contents over a frame time, or summing all pixel values in a frame which is a representation of the video, or detecting the peak value in a frame of the video. Here, the form of the video detector is of less importance. The assumption made is that the output of the video detector is a representation of the video level.

Further, there exists the requirement to maintain a sensor-camera's sensitivity under minimum light conditions to realize a use of the CCTV application even during night times.

SUMMARY OF THE INVENTION

According to the present invention, a sensor-camera of a CCTV video system is disclosed, in which the polarizing angle can be adjusted automatically. By means of a driven polarizer, the polarizing angle is adjustable over a portion of at least 180° with an accuracy of a few degrees. In order to achieve this accuracy, the drive of the polarizer of the sensor-camera can be realized as a stepper-motor, or as DC motor using a gearbox to achieve low revelation speeds.

Preferably, the control of the polarizer which is used to vary the polarization angle is achieved by remote control or even more preferably via automatic control. For the determination of the optimum position of the polarizer, a control algorithm is applied. In order to determine the optimum position of the polarizer when varying the polarizing angle, information concerning the environmental conditions is required. This information is provided by the video detector of the camera, which determines the video level and in which information is stored concerning the light conditions and information concerning the threshold of the minimum light conditions. The criteria to determine the optimum position of the polarizer is to obtain the lowest video detector output which is equivalent to the maximum suppression of reflection.

This algorithm follows the strategy to find the minimum of all video detector outputs, i.e. the lowest video detector output. During the determination of the lowest video detector output, the polarization angle is continuously changed. The camera level control loop as sketched allows for finding the lowest video detector output which corresponds to the optimum position of the polarizer.

The polarizer, according to the present invention assigned to a sensor-camera, can be realized as a disk-shaped element, to which a drive is assigned, by the means of which the rotation position of the disk-shaped element can be varied. A further alternative is to realize the polarizers using opto-electric effects.

In the embodiment in which the polarizer is of a disk-shaped shape, the polarizer could be combined with an IR-filter which is required to obtain colour images. The polarizer filter, i.e. a combination of polarizer with an IR-filter covers the sensor of the camera over at least 180° of rotation. During low light conditions the disk-shaped polarizer filter is in a position in which the IR-filter and the polarizer are absent from the sensor of the camera.

BRIEF DESCRIPTION OF THE DRAWINGS

The invention now is further described by the accompanying drawings, in which:

FIG. 3 shows the polarizer filter according to FIG. 1 in a second position, the polarizing being 135°, FIG. 4 shows a block diagram of the camera.

DETAILED DESCRIPTION OF THE PREFERRED EMBODIMENTS

Figure 1:
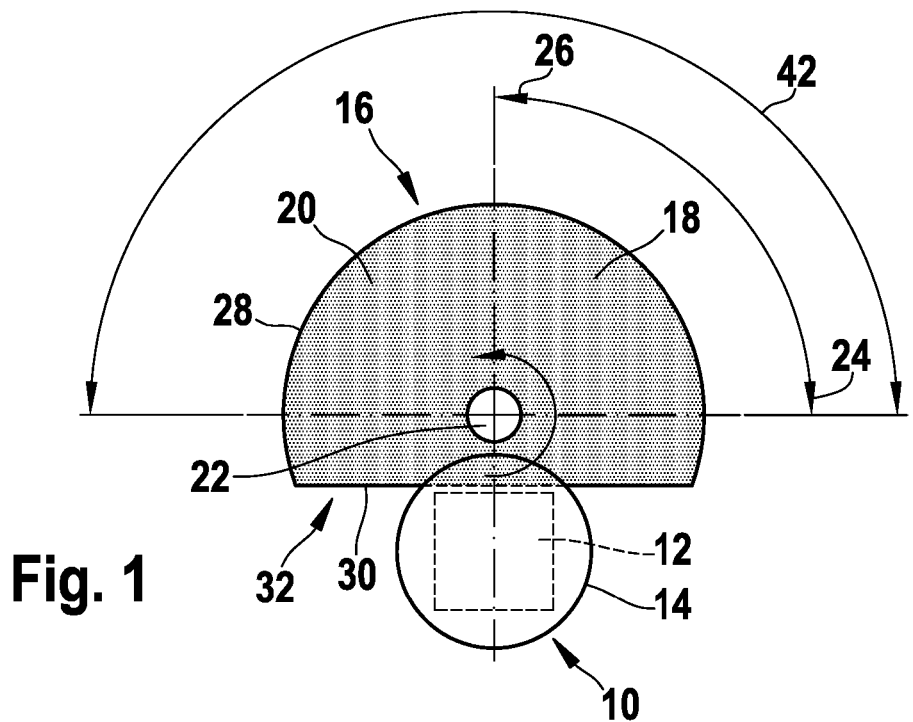
FIG. 1 shows a polarizer filter, assigned to a sensor-camera, the polarizer filter being a combination of a polarizer and an IR-filter, being not in front of the sensor.

FIG. 1 shows a first embodiment of the present invention in which a polarizer in disk-shaped form is assigned to a camera of a CCTV-application.

According to this embodiment, a camera device 10 comprises a sensor 12 having a lens, the exit pupil of which is labelled with reference number 14. The camera device 10 further comprises a polarizer element 16 in which an IR-filter 18 and a polarizer area 20 are combined. The polarizer element 16 is rotatable about an axis of rotation labelled 22 in a first direction indicated by arrow 24 and in a second direction indicated by arrow labelled 26. The polarizer element 16 has an outer circumference 28 and a base 30 and is shown in its inactive position 32. In the inactive position 32, best shown in FIG. 1, the sensor 12 of the camera device 10 is not covered by the polarizer area 20 but is instead withdrawn into a position where the integrated IR-filter 18 and the polarizer-area 20 are offset from the sensor 12 which is important during low light conditions.

By means of a drive, for example a stepper-motor, the polarizer element 16 is rotatable about its axis of rotation 22. The rotation angle of the polarizer area can be varied within a 180°-angle of rotation. The accuracy obtained concerning the rotational position of the polarizer element 16 is within a few degrees, for instance between 5° and 10°-rotation angles. Due to the shape of the polarizer element 16, it is ensured that in the inactive position 32 given in FIG. 1, the complete transparent mode is available in order to maintain the sensor's 12 sensitivity, even under minimum light conditions, for instance during night times.

This addresses the circumstance that all polarizing filters by definition attenuate 50%, but in practice even 60% to 70%. By the shape of the polarizer element 16 in the first embodiment according to the present invention, this advantage inherent to polarizer element 16 is ruled out, since in the inactive position 32, the complete transparent mode is realized concerning the sensor's 12 sensitivity.

Figure 2:
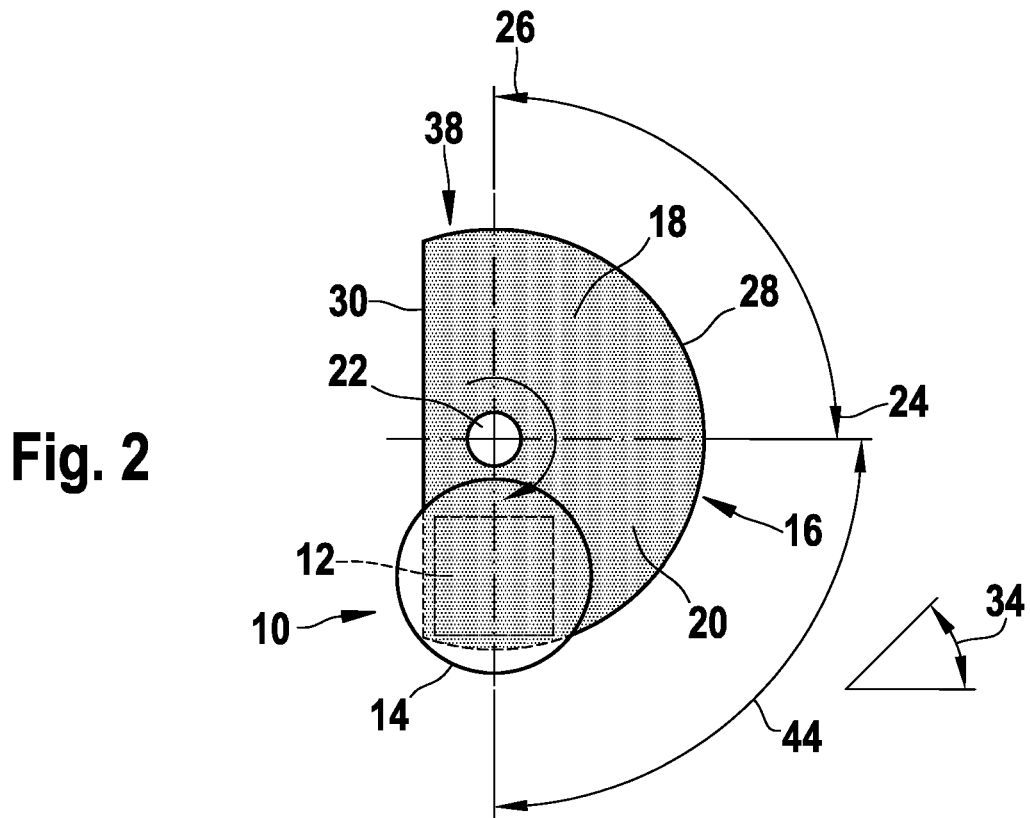
FIG. 2 shows the polarizer filter in a first position, the polarizing angle being 45°

In FIG. 2, a first position of the polarizer element 16 is given, the polarizer element having an integrated IR-filter 18 and a polarizer area 20.

In the first position 38 of the polarizer element 16, the polarizer element 16 has performed a first 90°-rotation with respect to its inactive position 32 given in FIG. 1. The rotation about 90°, indicated by reference number 44, results in the disk-shaped polarizer element 16 being turned about its axis of rotation 22. Due to the rotation of the polarizer element 16, said polarizer area 20 now covers the exit pupil of lens 14 (shown in FIG. 1) and a first polarization angle 34 is realized. Due to the rotation of the polarizer element 16, said base 30 now adopts a substantially vertically extending position. The polarizer area 20 now is orientated into a first polarization angle 34. For adopting the first position 38 of the polarizer element 16, said disk-shaped polarizer element 16 is rotated by its drive, either a step motor or either a continuous drive motor, into the first direction 24 of rotation.

In FIG. 3, said polarizer element 16 comprising an integrated IR-filter 18 and the polarizer area 20 has adopted a second position 40. In this orientation, the polarizer element 16 is oriented upside down with respect to its inactive position 32 shown in FIG. 1. With respect to FIG. 2, the polarizer element 16 has been rotated about its axis of rotation 22 in another 90°-quarter rotation. With respect to the inactive position 32 of the polarizer element 16 shown in FIG. 1, said polarizer element 16 has performed a 180°-rotation, as indicated by arrow 46. In the second position 40 of the polarizer element 16, a second polarization angle 36 of 135° is realized.

FIG. 4 shows a block diagram of the camera. Light 50 is falling through the lens 14 and the polarizer/IR-filter 18, 20 on the sensor 12. The signal of the sensor 12 may or may not be processed further to generate a video signal 52. A video detector 54 takes the video signal 52 and generates a number which is representative for the video level. The number is used by a search algorithm 60 that may be hardware or software. The algorithm 60 makes the drive control 58 via motor 56 to turn the IR/polarizer disk 18, 20 in a certain direction and tracks if the video output increases or decreases. If it decreases, it continues in that direction, if it increases, the direction of rotation is reversed. For the case that the video output is not changed and it is certain to be at a minimum, the drive control 58 for turning the IR/polarizer disk 20 is stopped.

The control of the disk-shaped polarizer element 16, shown in greater details in FIGS. 1, 2 and 3, respectively, the rotation of which is realized by a drive to reach the optimum position, is preferably performed automatically. To find the optimum position for the polarizer element 16, a search and a control algorithm 60 is provided. Said sensor 12 comprises a video detector 54. The video detector 54 sums up the values of all pixels available from the sensor 10. The criterion to be met is to obtain the lowest video detector output which corresponds to a maximum suppression of reflection. Variations of the video detector 54 as function of the polarizer rotation are in general in the magnitude of about 30%. During the search algorithm 60, the minimum value for the video detector output is searched, while driving the polarization element 16 continuously. During the search for the minimum value of the video detector output, an interaction between the camera level control loops and the polarizer element 16 are interrupted. By having implemented the search algorithm 60, the polarizer element 16 is adjusted at intervals to its optimum position.

In the embodiments shown in FIGS. 1, 2 and 3, the polarizer element 16 is shown as a combined polarizer-filter, comprising a polarizer area 20 and an integrated IR-filter 18. The integrated IR-filter 18 is required to take coloured images. When it is in position according to FIG. 1, the image should be switched to black and white, as colour performance cannot be guaranteed.

The camera device 10 according to the present invention is continuously looking for the lowest value for the video detector output. The determination of the lowest video detector output is coupled to a driving of the polarizer element 16 which is a challenge for the mechanics involved. To avoid undue wear of the mechanics, the search algorithm 60 can be stopped after a few cycles and the polarizer element 16 consequently is to be kept in the established optimum position. If, however, the sensor 12 of the camera device 10 adopts a new position or if the video contents, i.e. the pictures being taken by the pixels, completely changes, then a new run for obtaining an optimum position of polarizer element 16 assigned to the sensor 12 can be initiated. Alternatively, the search algorithm 60 can be started by the operator using a remote control facility. Further, to reduce the wear of the mechanical components involved to drive the polarizer element 16 upon finding an optimum position for the polarizer element 16 when the search algorithm 60 is initiated, a timed update can be performed, since the polarization effect is dependent on the daylight conditions and particularly on the position of the sun. Thus, the search for the optimum position of the polarizer element 16, can be coupled to certain fixed times of the day, for instance every hour. This means that per day the optimum position is determined only twelve times or even less.

The polarizer element 16 according to the embodiments given in FIGS. 1, 2 and 3 comprises said integrated IR-filter 18 and the polarization area 20. Depending on the lines of the polarization element 16, the first polarization angle 34 of about 45° can be reached in the first position 38 of the polarizer element 16 as shown in FIG. 2. In the second position 40 of the polarizer element 16, the second polarization angle 36, i.e. about 135°, is realized. Concerning the geometry of the polarizer element 16, this area is calculated dependent on the size of the sensor 12. If the sensor 12 has a rectangular cross section defined by base and height, then the minimum radius of the polarizer element 16 with respect to its axis of rotation 22 is given by $$r = \mathrm{sqrt}(\tfrac{1}{2}b^2 + (h + \tfrac{1}{2}b)^2)$$

where r=radius, b=base and h=height.

In general, b equals 4/3 h which results in sqrt (53/9 $h^2$)=~2.45 h.

For common geometries using a ⅓", height h=3.64 mm, consequently, r=8.92 mm. In practice, the radius of the polarizer element 16 is somewhat larger. The limitation for the radius of the polarizer element 16 according to the present invention is the building space which is present in a standard sized camera. The polarizer element 16 is preferably to be integrated into a standard sized camera to avoid modifications of existing designs.

In an alternative embodiment, the polarizer element 16 can be made as a component, having a polarizer area 20, an integrated IR-filter 18 partially covered by the polarizer area 20 and a segment 48 without polarizer or IR-filter.

According to the alternative embodiment given in FIGS. 5 to 8, respectively, the polarizer element 16 is in general of disk shape. In the embodiment given in FIGS. 5 to 8, said polarizer element 16 comprises the polarizer area 20, in integrated IR-filter as well as a segment 48 without IR-filter and polarizer.

Figure 5:
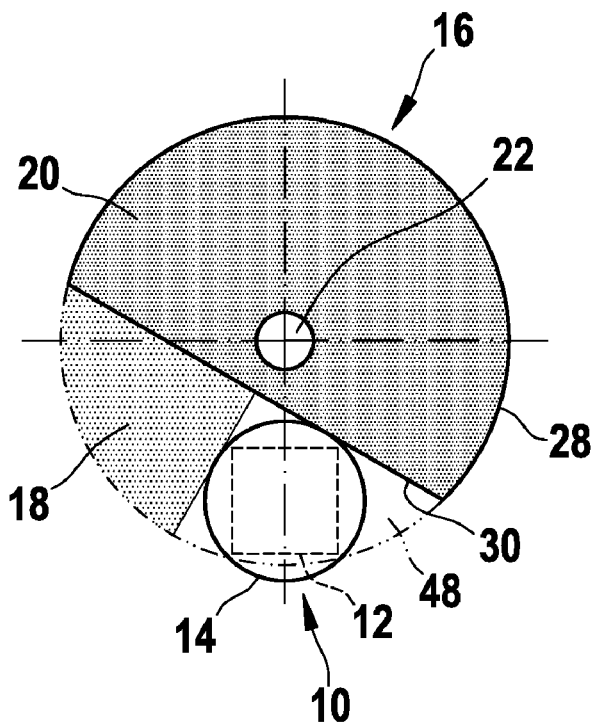
FIG. 5 shows a polarizer filter assigned to a sensor-camera, the polarizer filter being a combination of a partial polarizer and an air filter being not in front of the sensor.

According to FIG. 5, the polarizer element 16 assigned to said sensor 12 is given in a position in which the polarizer area 20 as well as the IR-filter 18 are absent from the lens 14. The position given in FIG. 5 corresponds to the position of the polarizer element 16 given in FIG. 4 according to which light 50 penetrates said lens 14 in front of the sensor 12.

Figure 6:
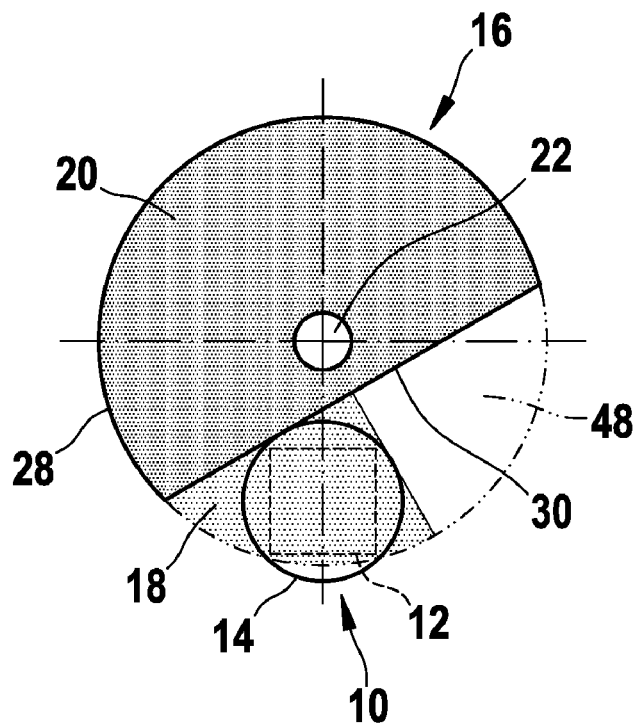
FIG. 6 shows a first position where the polarizer is not and the IR-filter is in front of the sensor.

In FIG. 6, said polarizer element 16 is turned about its axis of rotation 22, being driven by said drive 56 according to FIG. 4 into a position in which the integrated IR-filter 18 only is present in front of said sensor 12. The segment 48 without IR-filter 18 and without polarizer has turned away from said sensor 12 into counterclockwise direction.

Figure 7:
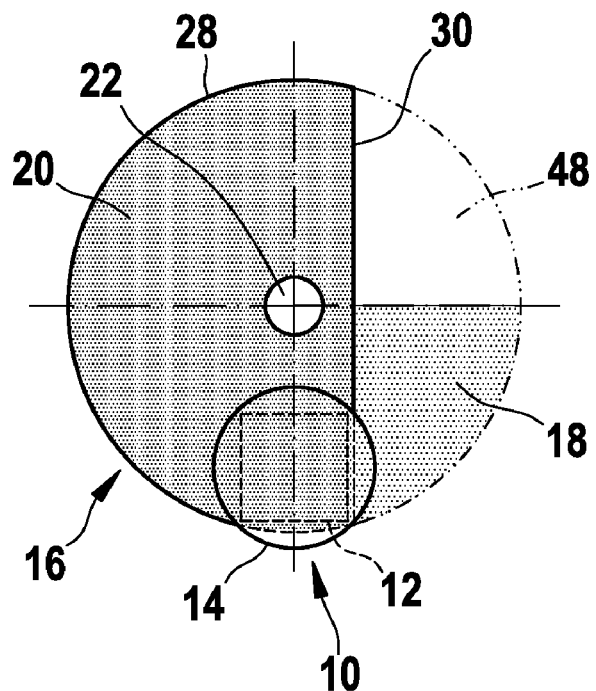
FIG. 7 shows the polarizer filter and the IR-filter in front of the sensor, the polarizing angle being 90°

Starting from the rotation position given in FIG. 6, according to FIG. 7, the polarizer element 16 is further turned in counterclockwise direction about its axis of rotation 22 into a position in which the polarizing angle corresponds to 90°. In the position given in FIG. 7, the polarizer area 20 of said disk-shaped polarizer element 16 covers the front of said sensor 12 entirely. The base 30 of said polarizer area 20 in this position adopts a substantially vertical position. Upon further rotation of said polarizer element 16 into counterclockwise direction, the polarization area 20 moves further into counterclockwise direction.

Figure 8:
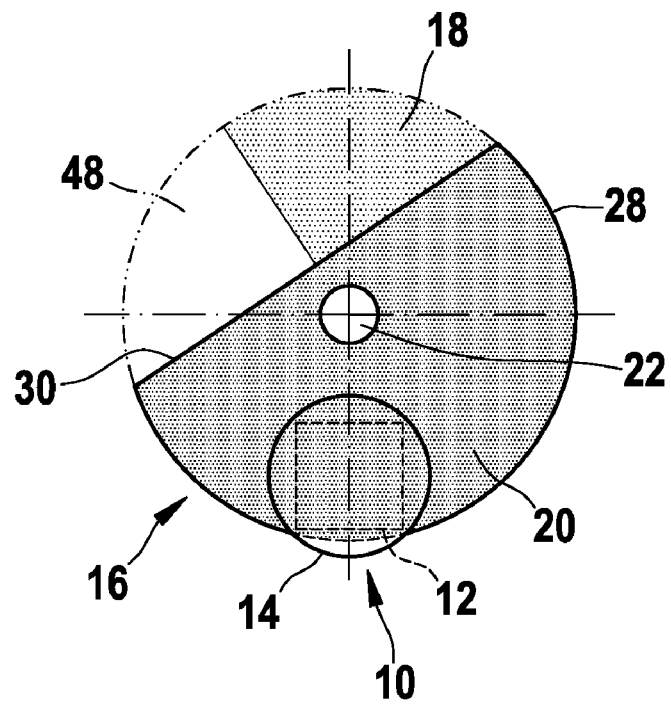
FIG. 8 shows the polarizer filter and the IR-filter in front of the sensor, the polarizing angle being an arbitrary angle.

In the stage given in FIG. 8, the rotational position of the polarizer area 20 of said disk-shaped polarizer element 16 results in an arbitrary polarizing angle. A stepwise rotation of the polarizer area 20 between the positions given in FIG. 7 and FIG. 8, respectively, allows for adjustment of selective polarizing angles which may depend on the application of the camera device 10 having said sensor 12.

In the position according to FIG. 6 according to the present invention, a color image can be taken, since there is an IR-filter 18 present in front of said sensor 12, however, the polarizing area 20 of said disk-shaped polarizer element 16 is absent, so that the attenuation by the polarization is not applicable in this special position according to FIG. 6.

The invention claimed is:

1. A camera device (10) for CCTV applications, comprising:
   a sensor (12) comprising a lens (14) for monitoring a scene in front of the camera device (10)
   at least one polarization element (16) is assigned to said sensor (12), the at least one polarization element (16) being rotatably mounted with respect to said sensor (12), wherein the at least one polarization element (16) is driven by a drive about a rotation axis (22) about an angle of rotation of about at least 180°, wherein the polarizer element (16) is rotatable and by stopping the polarizer element (16) at least an inactive position (32) in which a complete transparent mode of the lens (14) of the sensor (12) is achieved, a first position (38) in which a first polarization angle (34) is achieved, and a second position (40) in which a second polarization angle (36) is realized, wherein in the first position (38), the first polarization angle (34) is 45° and in the second position (40), the second polarization angle (36) is 135°.

2. The camera device (10) according to claim 1, wherein said at least one polarization element (16) is a polarizer filter having an integrated IR-filter (18) and a polarizer area (20).

3. The camera device (10) according to claim 2, wherein the integrated IR-filter (18) partially covers the polarizer area (20) and said at least one polarization element (16) comprises a segment (48) free of the polarizer area (20) and free of said IR-filter (18).

4. The camera device (10) according to claim 1, wherein the at least one polarization element (16) is rotated to adjust a polarizing angle to an optimum position in which a suppression of reflections reaches it maximum value and a video detector (54) output reaches its minimum.

5. The camera device (10) according to claim 1, wherein the at least one polarization element (16) is of disk-shaped form having a longitudinally extending base (30) which limits a circular-shaped area (20).

* * * * *